(12) United States Patent
Shiloh et al.

(10) Patent No.: US 6,936,793 B1
(45) Date of Patent: Aug. 30, 2005

(54) OVEN APPARATUS AND METHOD OF USE THEREOF

(75) Inventors: Adam Shiloh, Huntingdon Valley, PA (US); Peretz J. Shiloh, Bensalem, PA (US); Avraham Shiloh, Huntingdon Valley, PA (US); Viktor Kapiliovich, Holland, PA (US)

(73) Assignee: Novastar Technologiesm Inc., Huntingdon Valley, PA (US)

( * ) Notice: Subject to any disclaimer, the term of this patent is extended or adjusted under 35 U.S.C. 154(b) by 232 days.

(21) Appl. No.: 10/124,382

(22) Filed: Apr. 17, 2002

(51) Int. Cl.[7] .............................................. F27D 11/00
(52) U.S. Cl. ...................... 219/400; 219/388; 219/394; 219/417; 219/398; 219/452.12; 228/180.21; 228/219; 126/21 A; 99/386; 99/474; 34/215; 34/216; 34/224
(58) Field of Search ................................ 219/388, 400, 219/452.12, 394–395, 398; 228/180.1, 118, 228/187, 219, 180.21; 126/21 A; 99/443 C, 99/386, 474.5, 474–475, 215–216; 34/215–216, 34/218, 224–226; 392/417

(56) References Cited

U.S. PATENT DOCUMENTS

| 4,434,845 A | 3/1984 | Steeb |
| 4,978,836 A | 12/1990 | Dieudonne et al. |
| 4,990,402 A | 2/1991 | Kneringer et al. |
| 5,193,735 A | 3/1993 | Knight |
| 5,515,605 A | 5/1996 | Hartmann et al. |
| 5,567,151 A * | 10/1996 | Mizoguchi et al. ......... 432/145 |
| 5,647,529 A | 7/1997 | Liebman et al. |
| 5,739,053 A | 4/1998 | Kawakita et al. |
| 5,795,147 A | 8/1998 | Saxena et al. |
| 5,814,789 A | 9/1998 | O'Leary |
| 5,860,583 A | 1/1999 | Liebmann et al. |
| 5,888,102 A | 3/1999 | Strickland |
| 5,911,486 A | 6/1999 | Dow et al. |
| 5,913,589 A | 6/1999 | Dow et al. |
| 5,919,317 A | 7/1999 | Tanahashi et al. |
| 6,015,966 A | 1/2000 | Rehm |
| 6,084,214 A | 7/2000 | Tallman et al. |
| 6,106,281 A | 8/2000 | Materna |
| 6,123,250 A | 9/2000 | De Klein et al. |
| 6,129,256 A | 10/2000 | Watson et al. |
| 6,138,893 A | 10/2000 | Caletka et al. |
| 6,142,363 A | 11/2000 | Tanahashi et al. |
| 6,146,448 A | 11/2000 | Shaw et al. |

(Continued)

Primary Examiner—Shawntina Fuqua
(74) Attorney, Agent, or Firm—Sperry, Zoda & Kane

(57) ABSTRACT

A solder reflow oven with horizontal cyclonic convection air flow for enhancing equalized heating of printed circuit boards conveyed therethrough. Air circulation apparatus can include a first air movement fan for urging air to move horizontally laterally from the first side wall of the oven toward the second side wall of the oven across and above printed circuit boards being conveyed therethrough. A second air fan is positioned below and laterally displaced from the conveying means for directing a second air stream below the first air stream and oppositely oriented in order to urge movement of heated air across the undersurface of the conveyor for enhancing equalization of heating of the printed circuits boards thereupon. Preferably, both blowers are oriented to move air approximately perpendicularly with respect to the direction of movement of the conveyed printed circuit boards in opposite respective directions thereabove and therebelow.

19 Claims, 3 Drawing Sheets

U.S. PATENT DOCUMENTS

| | | |
|---|---|---|
| 6,157,002 A | 12/2000 | Schjerven, Sr. et al. |
| 6,226,864 B1 | 5/2001 | Muziol et al. |
| 6,230,956 B1 | 5/2001 | Farroni et al. |
| 6,236,029 B1 | 5/2001 | Leurquin |
| 6,276,593 B1 | 8/2001 | Artaki et al. |
| 6,289,715 B1 | 9/2001 | Gilbert et al. |
| 6,293,455 B1 | 9/2001 | Caletka et al. |
| 6,320,165 B1 | 11/2001 | Ovadia |
| 6,323,462 B1 | 11/2001 | Strand |
| 6,378,200 B1 | 4/2002 | Lim et al. |
| 6,379,036 B1 | 4/2002 | Halderman |

\* cited by examiner

OVEN APPARATUS AND METHOD OF USE THEREOF

BACKGROUND OF THE INVENTION

1. Field of the Invention

The present invention pertains to the field of ovens generally. More particularly, this invention is specifically usable as a construction for those ovens used for reflow soldering of electrical or other components to a printed circuit board positioned therewithin or conveyed therethrough.

Normally a printed circuit board will include a plurality of components positioned thereon for soldering in a predetermined pattern. A paste mixture of flux and solder is located at each position where a soldered electrical connection needs to be created between the component and the board. At least one separate heating chamber is included within a reflow oven and often as many as twelve or more separate heating chambers are utilized. The use of configurations having three heating chambers is quite common. These multiple heating environments allow each chamber to be maintained at different operating temperatures for providing the capability of designing a unique heating profile for the printed circuit boards as they pass through the entire solder reflow oven apparatus. In those systems using only a single heating chamber it is not uncommon to provide for batch heating of the articles to be heated instead of using a conveyor traveling therethrough.

Initially the printed circuit board is pre-heated up to a temperature sufficient for activation of the flux. The board temperature is then maintained at this activation temperature for a preset period of time, often defined as the "dwell" period, in order to allow the flux to become activated for preparing the surfaces of the electrical components and the printed circuit boards in order to create a soldered connection therebetween having very low resistance to current flow.

After the flux is fully activated for the dwell period, the printed circuit board is then heated to at least as high or greater than the melting temperature of the solder in order to initiate soldering of the leads of the electrical component to the printed circuit board at all required locations thereon. The temperature is maintained at a level at least as high as the solder melting temperature for a significant period of time in order to achieve fully conductive electrical connection between the leads of the electrical components and the attachment locations on the printed circuit board. Thereafter the board exits from the oven apparatus and is subsequently cooled.

The state of the art of oven convection flow technology has advanced significantly over the years. Also, the more specific technology associated with reflow ovens has also advanced to a great extent recently. In the original technology, the contacts of the electrical components extended through holes defined in the printed circuit board and this design was designated "through hole" technology. Thereafter, approximately twenty years ago more widespread use of surface mount technology was initiated wherein circuit patterns were defined on the printed circuit board by selective metallic deposition of circuit patterns directly on the printed circuit board and the components were attached at contact locations without any use of "through holes".

Historically the electrical lead lines from the components were positioned about the outer periphery of the component itself. More recently, however, these leads have been defined extending outwardly from the undersurface of the individual electrical components in various manners. One of the more common designs is the use of a ball grid array defined on the undersurface of the components. This configuration has significantly increased the difficulty of providing effective contact between the components and the printed circuit board circuitry since the contacts themselves are shielded or sandwiched in between the undersurface of the electrical component and the upper surface of the printed circuit board. The present invention provides a design which is particularly effective with ball grid array technology as well as more conventional surface mounted technology and electrical components utilizing J-leads, gull-wing leads or butt mountings.

Previously, various other heating technologies, such as infrared heating, were the preferred manners of raising the temperature within an oven such as a solder reflow oven. However recently the use of convection heating methods have become more widespread. Convection heating has a distinct advantage of providing a heating process which is not dependent on the color of the surface being heated.

However, infrared technology, since it is responsive to the various emissive characteristics of the components such as the color thereof, has some difficulty in achieving equalized heating of all areas of the circuit board and the electrical components positioned thereon. Convection heating does not have this problem. Also infrared heating emits the energy that causes heating by radiation. This energy transfer tends to create shadowing wherein cool spots can occur especially in those areas immediately adjacent to taller or large electrical components wherein the height of the electrical component might tend to shield certain areas needing to be soldered on the printed circuit board from the infrared heating source. This shadowing has proven to be a great problem in regard to equalizing of heating across the entire printed circuit board especially when conveyed through the oven. In particular smaller and shallower components which are located in close proximity to larger or taller ones are often exposed to less radiation. As such, convection is rapidly replacing infrared processes and is becoming the preferred method for solder reflow ovens currently.

The use of convection heating has been established as being a primary step toward achieving more equalized heating and articles in ovens generally. In particular, convection heating is useful for equalizing heating across the printed circuit board during the various several stages of the solder reflow process. If a significant temperature difference exists between any two areas of the printed circuit board or the electrical components thereof, then it is necessary to see that the entire temperature within the oven is raised such that the lowest temperature experienced therewithin is sufficiently high in order to achieve full reflow soldering of an electrical contact at this point. This process results in the overheating of certain areas which can lead to warping of the printed circuit board and also wastes much energy. Also wider heating parameter tolerances are required because of the wider range of temperature differences created across various points on the printed circuit board during reflow soldering. This widening of the parameter window is even more of a difficult problem in recent years since with the decreased usage of lead-based soldering materials and increased usage of silver-based soldering materials. Thus, it is particularly advantageous at this point to provide a reflow solder oven apparatus and a method of use thereof wherein the temperature differences at various locations across the printed circuit board and the components thereof is maintained at a very low level, preferably lower than two degrees Celsius.

In standard convection ovens the air is heated and then circulation occurs therewithin toward the article to be heated which may be a printed circuit board. These articles or printed circuit boards can be batch heated or can be conveyed through the internal environment of the oven. Normally movement of heated air is directed perpendicularly and downwardly toward the top of the printed circuit board or perpendicularly and upwardly toward the bottom of the circuit board. In other configurations, the air flow for achieving convective heat transfer is achieved by random turbulent flow of air throughout the heating environment. Both of these processes lead to an increase in temperature in the center area of the printed circuit board.

Generally, ovens used for all purposes tend to be warmer at the most central location and cooler at positions radially outward therefrom. Normally ovens are coolest at the outer wall thereof. This temperature difference creates a problem which has been shown to be very difficult to overcome effectively, and is a natural result of the physics of heat dissipation outwardly from the oven in all radial directions. This can be somewhat controlled by the use of effective insulation. However, the temperature differential between the center portion of the oven to the outer periphery thereof will always be significant due to the continual loss of heat outwardly radially from any oven.

Also, as air is directed toward the articles to be heated, such as printed circuit boards, it initially impacts the central area thereof. This air is heated and effectively heats the central areas of the printed circuit boards. The printed circuit boards will be significantly cooler than the surrounding environment prior to entry into the heated oven environment and, as such, will significantly lower the temperature of the heated air after impacting the central area thereof. This air will then move downwardly and outwardly horizontally along the upper surface of the printed circuit board. As the air moves along the surface of the printed circuit board it will dissipate heat slowly since it is raising the temperature of the board as it flows therealong approximately parallel across the surface. When the air reaches the outer periphery of the board, the temperature of the air is significantly reduced which lowers the temperature to which it can raised the outer regions of the boards. This effect will establish a temperature gradient across the printed circuit board from the central regions to the peripheral regions thereof. The printed circuit board will have high temperatures in the central portion and lower temperatures as you move outwardly in all directions radially along the surface of the printed circuit board. This same overheating problem will occur when heat is directed approximately perpendicularly to the conveyed circuit boards from below.

Velocity of air movement is also an important consideration in solder reflow oven design. The increased velocity or different velocities of heated air accelerates the efficiency of conduction of heat to the electrical component and the printed circuit board. However, excessive velocities can create other problems such as threatening to unseat components from their precise positions. Air movement devices which blow heat air directly onto the surface of a printed circuit board, using air flow jets or nozzles, must be very accurately controlled as to velocity in order to move fast enough to transfer a significant amount of heat to the board while at the same time being slow enough in order to prevent movement or damaging of components positioned thereon. This design requirement has the effect of introducing another parameter that must be closely monitored and controlled which provides another area requiring an operating tolerance which can be a problem.

2. Description of the Prior Art

Various configurations for ovens and methods of use thereof have been patented or otherwise disclosed which can achieve equalized heating across the expanse of articles located therewithin or passing therethrough such as shown in U.S. Pat. No. 4,434,845 patented Mar. 6, 1984 to D. C. Steeb on a "Stacked-Plate Heat Exchanger"; and U.S. Pat. No. 4,978,836 patented Dec. 18, 1990 to W. Dieudonne et al and assigned to Heraeus Quarzschmeize GmbH on a "Continuous Oven"; and U.S. Pat. No. 4,990,402 patented Feb. 5, 1991 to G. Kneringer et al and assigned to Schwarzkopf Development Corporation on a "Process For The Manufacture Of A Soldered Joint"; and U.S. Pat. No. 5,193,735 patented Mar. 16, 1993 to I. M. Knight and assigned to Knight Electronics, Inc. on a "Solder Reflow Oven"; and U.S. Pat. No. 5,515,605 patented to H. Hartmann et al on May 14, 1996 and assigned to Robert Bosch GmbH on an "Apparatus And Process For Soldering Component Onto Boards"; and U.S. Pat. No. 5,647,529 patented Jul. 15, 1997 to H. F. Liebman et al and assigned to Motorola, Inc. on a "Method Of Controlling The Temperature Of A Portion Of An Electronic Part During Solder Reflow"; and U.S. Pat. No. 5,739,053 patented Apr. 14, 1998 to T. Kawakita et al and assigned to Matsushita Electric Industrial Co., Ltd. on a "Process For Bonding A Semiconductor To A Circuit Substrate Including A Solder Bump Transferring Step"; and U.S. Pat. No. 5,795,147 patented Aug. 18, 1998 to N. Saxena et al and assigned to The BOC Group, Inc. on a "Furnace Having Regulated Flow Rate Of Inerting Gas"; and U.S. Pat. No. 5,814,789 patented Sep. 29, 1998 to B. O'Leary et al and assigned to BTU International, Inc. on a "Forced Convection Furnace Gas Plenum"; and U.S. Pat. No. 5,860,583 patented Jan. 19, 1999 to H. F. Liebman et al and assigned to Motorola, Inc. on an "Evaporative Cooling Vessel For controlling The Temperature Of A Portion Of An Electronic Part During Solder Reflow"; and U.S. Pat. No. 5,888,102 patented Mar. 30, 1999 to J. Strickland on a "Surface Mount Carrier For Electronic Components"; and U.S. Pat. No. 5,911,486 patented Jun. 15, 1999 to S. J. Dow et al and assigned to Conceptronic, Inc. on a "Combination Product Cooling And Flux Management Apparatus"; and U.S. Pat. No. 5,913,589 patented Jun. 22, 1999 to S. J. Dow and assigned to Conceptronics, Inc. on a "Combination Product Cooling And Flux Management Apparatus"; and U.S. Pat. No. 5,919,317 patented Jul. 6, 1999 to A. Tanahashi et al and assigned to Nippondenso Co., Ltd. on "Soldering Flux, Soldering Paste And Soldering Method Using The Same"; and U.S. Pat. No. 6,015,966 patented Jan. 18, 2000 to J. Rehm and assigned to Rehm Anlagenbau GmbH & Co. on a "Circuit Board Heating Apparatus; and U.S. Pat. No. 6,084,214 patented Jul. 4, 2000 to St. Tallman et al and assigned to Conceptronic, Inc. on a "Reflow Solder convection Oven Multi-Port Blower Subassembly"; and U.S. Pat. No. 6,106,281 patented Aug. 22, 2000 to P. Materna on a "Method Of Reducing The Flow Of Gas Needed For A Chamber With Controlled Temperature And Controlled Composition Of Gas"; and U.S. Pat. No. 6,123,250 patented to F. DeKlein et al on Sep. 26, 2000 and assigned to Soltec B. V. on a "Reflow Oven"; and U.S. Pat. No. 6,129,256 patented Oct. 10, 2000 to J. R. Watson et al and assigned to Intel Corporation on a "Reflow Furnace For An Electronic Assembly"; and U.S. Pat. No. 6,138,893 patented Oct. 31, 2000 to D. V. Caletka et al and assigned to International Business Machines Corporation on a "Method For Producing A Reliable BGA Solder Joint Interconnection"; and U.S. Pat. No. 6,142,363 patented Nov. 7, 2000 to A. Tanahashi et al and assigned to Nippondenso Co., Ltd. on a "Soldering Method Using Soldering Flux And Soldering Paste"; and U.S. Pat. No. 6,146,448 patented Nov. 14, 2000 to R. G. Shaw et al and assigned to Soltec B. V. on a "Flux Management System For A Solder Reflow Oven"; and U.S. Pat. No. 6,157,002 patented Dec. 5, 2000 to W. S. Schjerven et al and assigned to Middleby Cooking Systems Group on a "Small conveyor Toaster/Oven"; and U.S. Pat. No. 6,226,864 patented May 8, 2001 to M. Muziol et al and assigned to Heraeus Electro-Nite International N. V. on a "Process For Producing Printed Circuit Boards With At Least One Metal Layer, Printed Circuit Board And Use Thereof"; and U.S. Pat. No. 6,230,956 patented May 15, 2001 to J. Farroni et al and assigned to STMicroelectronics S.A. on a "Soldering Conveyor Support"; and U.S. Pat. No. 6,236,029 patented May 22, 2001 to M. Leurquin and assigned to Alcatel on an "Apparatus For Soldering Flat Rectangular Connectors And Method Using Same"; and U.S. Pat. No. 6,276,593 patented Aug. 21, 2001 to I. A. Artaki et al and assigned to Agere Systems Guardian Corp. on an "Apparatus And Method For Solder Attachment Of High Powered Transistors To Base Heatsink"; and U.S. Pat. No. 6,289,715 patented Sep. 18, 2001 to C. Gilbert et al and assigned to L'Air Liquide, Societe Anonyme pour l'Etude et l "Exploitation des Procedes Georges Claude on a "System For Analyzing The Atmosphere In An Enclosure For Soldering Or Tinning By Means Of A Metal Alloy"; and U.S. Pat. No. 6,293,455 patented Sep. 25, 2001 to D. V. Culetka et al and assigned to International Business Machines Corporation on a "Method For Producing A Reliable BGA Solder Joint Interconnection"; and U.S. Pat. No. 6,320,165 patented Nov. 20, 2001 to D Z. Ovadia and assigned to Pizza Hut, Inc. on "Impingement Oven Airflow Devices And Methods"; and U.S. Pat. No. 6,323,462 patented Nov. 27, 2001 to D. Strand and assigned to Wisconsin Oven Corporation on a "Conveyor Oven Usable As Pre-Bake Oven In A Print Plate Imaging And Processing System And Method Of Using Same".

SUMMARY OF THE INVENTION

The present invention provides a uniquely improved configuration for an oven apparatus utilizing horizontal convection heating which can effectively equalize the temperature across a article such as a printed circuit board located therein. These articles can be conveyed through the oven environment and are particularly usable for reflow soldering of electrical components thereto to circuit boards.

This oven design includes a housing defining at least one heating chamber therewithin to facilitate the heating which can be used for reflow soldering of components to printed circuit boards positioned therein or conveyed therethrough. Preferably the oven housing can be divided into two or more separate heating chambers for facilitating varying temperature controls therewithin at different locations along the path of conveying. Often three such heating chambers are utilized to allow more accurate control of the changes in temperature of print circuit boards conveyed therealong. However, the concepts of this design can be utilized in systems having only one single heating chamber or can be utilized in systems having as many as twelve or more individual heating chambers. The use of more heating chambers has the advantage of allowing more control over the temperature curve for articles being heated therewithin.

This design is also usable for batch heating within a single heating chamber thus avoiding the need for a conveying system entirely. During such batch heating, a plurality of articles to be heated are individually placed upon a support surface within the oven and are removed after being processed therewithin.

The oven housing preferably will define a chamber inlet which is in fluid flow communication with respect to the internal heating chamber. The oven housing preferably will also define a chamber outlet spatially disposed from the chamber inlet and in fluid flow communication with respect to the heating chamber. Use of this design with a conveyor will define a path of conveyance for the printed circuit boards which will include initial movement into the heating chamber through the chamber inlet and movement through the one or more sections of the heating chamber and finally exiting therefrom through the chamber outlet.

The oven housing further is configured to include a first side wall extending from the chamber inlet laterally along the conveyed printed circuit boards to the chamber outlet. The oven housing preferably will also include a second side wall extending from the chamber inlet to the chamber outlet on the opposite side of the conveyed printed circuit boards from the first side wall. In this manner the first and second side wall can define the heating chamber therebetween. Structurally the chamber will also include and lower member and an upper member which are detachable with respect to one another. In such designs, usually the top member is removable from the position above the lower member to provide access to the interior of the heating chamber for various purposes as needed.

Each of the one or more heating chambers will preferably include a heating means positioned therewithin for heating of air moving within the housing in the environment immediately adjacent to the printed circuit board being conveyed therethrough.

A conveying device can be included, such as an open surface conveyor, which will also extend into the heating chamber through the chamber inlet between the first side wall means and the second side wall means and which will be oriented extending outwardly from the heating chamber through the chamber outlet. This conveying means will preferably define an upper support surface thereon adapted to carry printed circuit boards thereon with electrical components specifically positioned thereon for movement therewith through the heating chamber for reflow soldering together. The conveying device preferably is continuously movable from the chamber inlet to the chamber outlet through the heating chamber. The conveyor preferably is of an open configuration such as being made from an open chain or open linked material to facilitate air flow therethrough for further equalizing convective heating of the articles carried thereon from below as well as above for facilitating equalization of heating thereof. The heating device extends preferably in a direction extending parallel to the direction of movement of the conveying means within the heating chamber above and below the conveying means. In alternative configurations, the heating means can be extended perpendicular to the direction of movement of the conveyor or can be angularly oriented with respect thereto.

An air circulation apparatus is included positioned within the heating chamber for urging movement of air adjacent to the heating device for heating thereof. This air circulation apparatus is preferably located adjacent to the path of movement of the printed circuit boards traveling upon the conveyor. This air circulation means preferably includes a first air movement device and a second air movement device.

The first air movement device preferably includes a first fan and a first drive for powering of the first fan. They are preferably secured with respect to the first side wall of the oven housing at a position above and laterally to the side of the conveying means and the printed circuit boards traveling therewith. The first air movement fan is operable to urge movement of heated air in a direction from the first side wall toward the second side wall laterally across and above the conveyor and the printed circuit boards traveling therewith. The first air movement fan will direct the flow of heated air approximately parallel with respect to the upper support surface of the conveying means and with respect to the printed circuit boards positioned thereon in order to facilitate convection heating thereof from above for reflow soldering of components thereon. This heated air will flow over the top surface of the printed circuit boards traveling thereby in a direction approximately parallel to the upper surface. Preferably, this air will move in a laminar flow pattern to facilitate heat transfer to the printed circuit board and electrical components. This first air movement device is preferably positioned to move air in a direction perpendicularly with respect to the direction of movement of the conveying means across the printed circuit boards carried thereon.

A second air movement device is included preferably including a second fan and a second drive for powering thereof. This second fan device is preferably secured with respect to the second side wall of the oven housing at a position lower than the conveying means and to the side therefrom such that it is operable to urge movement of heated air in a direction from the second side wall toward the first side wall laterally beneath the conveyor and across the lower surface of the printed circuit boards for heating thereof from below. This second air movement fan is preferably secured with respect to the second side wall and oriented in order to be positioned below and laterally displaced from the conveyor. In this manner it can move heated air below the conveying means in a direction approximately parallel with respect to the conveying means and with respect to the undersurface of the printed circuit boards positioned thereon. In this manner heating of the printed circuit boards and the electrical components from below will be achieved for reflow soldering. The second air fan is preferably positioned and oriented in such a manner as to urge this heated air below the conveying means in a lateral direction extending approximately perpendicular with respect to the direction of movement of the conveying means and the printed circuit boards traveling thereon. Preferably the air from the second air fan traveling along the undersurface of the printed circuit board will assume a laminar flow pattern to facilitate convective equalized heating thereof. Also, the conveyor will preferably be an open conveyor such as a wide link chain conveyor to facilitate flow of heated air from the second air flow means to travel along the undersurface of the printed circuit boards being conveyed thereadjacent.

In the preferred configuration the first air movement fan is adapted to urge the movement of heated air laterally across the upper support surface of the conveyor and across the printed circuit boards located thereon and downwardly therefrom to a position adjacent to the second air movement fan. In this manner heated air will be supplied to a position adjacent the second air movement fan in order to facilitate in the urging of heated air by the second air fan in the opposite direction below the upper support surface of the conveyor for achieving heating of the printed circuit boards equally thereover from both lateral directions to facilitate equalization of heating which is particularly important for an oven environment during reflow soldering of components thereto.

To aid in this recirculation of the air a first guide means can be included having first arcuate guide plates positioned within the heating chamber above the second air movement fan for guiding of air downwardly toward the second air fan after passing over the upper support surface of the conveyor and over the printed circuit boards being carried thereon.

In a similar manner a second guide means can be included comprising preferably a plurality of second arcuate plates positioned within the heating chamber below the first air movement fan for guiding of air upwardly. In this manner, heated air can be directly supplied to a position adjacent to the first air movement fan after this air is passed below the conveyed printed circuit boards by the second air fan.

This redirecting of heated air between the upper chamber and the lower chamber can also be achieved by the inclusion of angled walls defined in the housing interior. These angled wall can be place adjacent each oppositely located fan for deflecting air toward each of the fans for facilitate recirculation of heated air thereto. Preferably, the walls will be oriented at approximately forty five degrees relative to the support surface for the articles to be heated to facilitate recirculating air flow therearound.

With these various oven designs a unique method of air movement is achieved wherein heated air is first circulated in the upper areas of the reflow oven above and laterally across the upper surface of the printed circuit boards while they are being conveyed through the solder reflow oven for facilitating heating thereof for soldering the components thereto. Simultaneously, heated air is circulated along a second path in the lower areas of the printed circuit boards in a direction oppositely oriented to the direction of the first circulation of air and displaced downwardly therebelow to. In this manner, these two air flow patterns will facilitate equalization of heating of the printed circuit boards during reflow soldering of components thereto while they are being conveyed through the solder reflow oven.

With these recirculating air flow patterns, the first heating air will circulate having initial contact with the portion of the printed circuit boards closest to the first side of the oven. Thus, this heated air flow will cause the temperature of the first side of the printed circuit board to be greater than the second side thereof. This temperature difference occurs because as the heated air travels along the circuit board it will be cooled by being brought into contact with the cooler electrical components and the cooler printed circuit board. Thus as the first air flow moves along the upper surface of the board the air itself will lose heat and will heat the board and the components thereon to a lesser extent. Thus, the second side of the printed circuit board, closest to the second wall of the oven, will be heated the least amount due to this first air flow pattern. Thus, this first air flow means will raise the temperature of the first portion thereof closest to the first side of the oven to a temperature higher than the other side of the printed circuit board, which we refer to as the second side of the printed circuit board.

On the other hand the second heated air which is circulated below the printed circuit board and in the opposite direction therebeneath will heat the printed circuit board and components with a temperature gradient opposite from that of the first circulated heated air. That is, the second circulated air heated below will initially contact the second side of the printed circuit board, closest to the second wall of the oven, from below and will be responsible for raising the temperature thereof. As the second air travels along the lower surface of the printed circuit board is will lose more and more heat from convection due to exposure to the board which is cooler. Thus the second side of the printed circuit board will be raised to a higher temperature than the first side thereof when considering only the heat provided thereto by the second air flow patterns. The second air flow pattern will impart a temperature gradient laterally across the printed circuit boards from the higher temperatures of the second side thereof to the lower temperatures of the first side thereof. Thus, the temperature gradient introduced by the first air flow means will be similar to the gradient introduced by the second air flow means but will be oppositely oriented.

As such, a temperature gradient will be imparted to the printed circuit board in opposed directions by the first air movement means and the second air movement means in such a manner as to tend to negate one another and create equalized heating across the printed circuit board or other article being heated. This is an important consideration in evaluating the novel improvements set forth in oven design and method of the present invention.

It is an object of the present invention to provide an oven apparatus and method of use thereof which can equalize heating laterally across any article positioned therein for heating.

It is an object of the present invention to provide an oven apparatus and method of use thereof which minimizes energy requirements by allowing operation of the heating devices therein within narrow heating tolerances.

It is an object of the present invention to provide an oven apparatus and method of use thereof which is easily maintained.

It is an object of the present invention to provide an oven apparatus and method of use thereof which eliminates the requirement of any plenum chamber for heating located externally from the heating chamber itself.

It is an object of the present invention to provide a solder reflow oven apparatus and method of use thereof which can effectively be used with leaded or lead-free soldering compositions.

It is an object of the present invention to provide an oven apparatus and method of use thereof which provides a horizontal flow of air in two opposed directions vertically displaced from one another to provide equalized horizontal convection heating and recirculation of heated air.

It is an object of the present invention to provide a solder reflow oven apparatus and method of use thereof which provides a cyclonic recirculating heating configuration resulting from lateral movement in one direction above the printed circuit board and the components thereon and also including movement of heated air laterally in the opposite direction therebelow.

It is an object of the present invention to provide a solder reflow oven apparatus and method of use thereof which can achieve a small temperature differential when measured from the hottest to the coldest point of the printed circuit board and the components thereof during reflow soldering.

It is an object of the present invention to provide a solder reflow oven apparatus and method of use thereof which is particularly usable with the many different types of electronic components having contacts defined on and adjacent the undersurface thereof such as ball grid array devices.

It is an object of the present invention to provide an oven apparatus and method of use thereof which minimizes air volume flow differentials across the surfaces of the articles being heated.

It is an object of the present invention to provide a solder reflow oven apparatus and method of use thereof which eliminates the problem of "shadowing" common to infrared heated solder reflow ovens.

It is an object of the present invention to provide a solder reflow oven apparatus and method of use thereof which minimizes air flow pressure differentials across the printed circuit board.

It is an object of the present invention to provide a solder reflow oven apparatus and method of use thereof which can effectively supply heated air in the narrow areas between an electrical component and the printed circuit board for facilitating equalization of heating which is particularly useful with electrical components having contacts positioned thereunder, such as ball grid array devices.

It is an object of the present invention to provide a solder reflow oven apparatus and method of use thereof which provides a cyclonic recirculation path for heated air for convection heating of a printed circuit board and an electrical component with air extending parallel to the printed circuit board thereabove and parallel to the printed circuit board therebelow in laterally opposed directions.

It is an object of the present invention to provide a solder reflow oven apparatus and method of use thereof which minimizes the requirement for a flux management system since all interior surfaces of the oven are maintained at approximately equal temperatures thereby eliminating excessively cool surfaces which tend to accumulate volatile flux components and require the inclusion of expensive and difficult to maintain flux management systems.

It is an object of the present invention to provide a solder reflow oven apparatus and method of use thereof which eliminates the requirement of an external heating plenum which includes cool interior surfaces which tend to accumulate the volatile flux elements and require the inclusion of a flux recycling management apparatus.

BRIEF DESCRIPTION OF THE DRAWINGS

While the invention is particularly pointed out and distinctly claimed in the concluding portions herein, a preferred embodiment is set forth in the following detailed description which may be best understood when read in connection with the accompanying drawings, in which:

DETAILED DESCRIPTION OF THE PREFERRED EMBODIMENT

Figure 1:
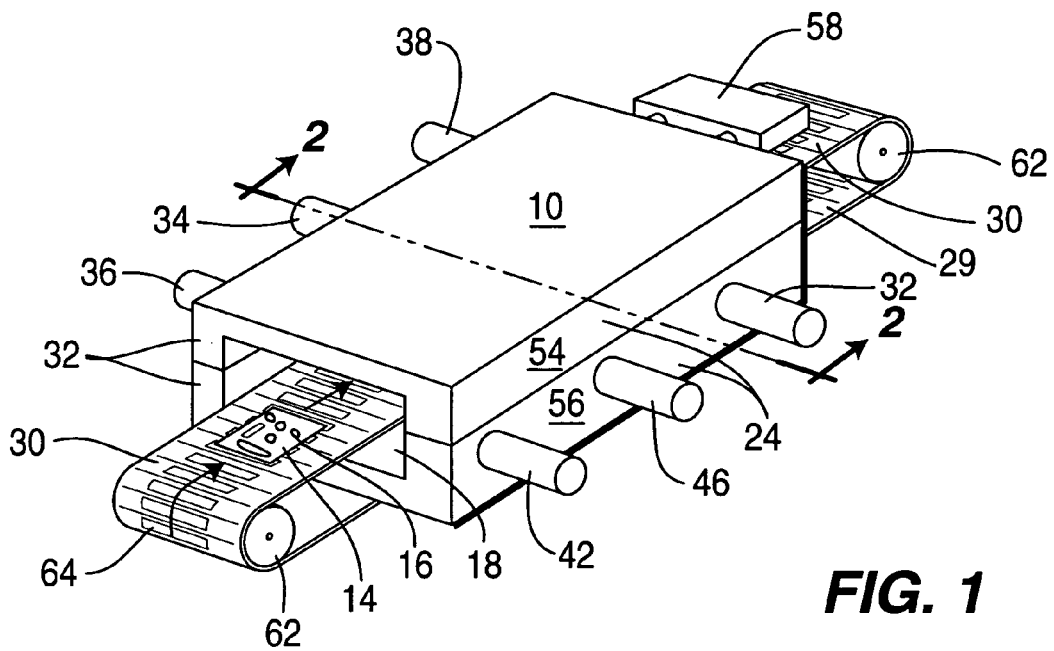
FIG. 1 is a perspective illustration of an embodiment of an oven apparatus in accordance with the present invention shown including a conveying device.

The present invention provides an enhanced design for an oven that can be used for heating of articles evenly therein and, is particularly, useful for soldering of components such as electrical devices onto printed circuit boards. This preferred configuration of the oven includes an oven housing 10 defining one or more heating chambers 12 therewithin. The oven defines a chamber inlet 18 and a chamber outlet 20 spatially distant from one another and both in fluid flow communication with respect to the heating chamber 12 defined therebetween. An upper support surface can be in included for supporting the articles to be equally heating therewithin. The upper supporting surface can be provided by a conveying means 29 which is oriented extending through the chamber inlet 18 and through the heating chamber 12 for exiting thereof at the chamber outlet 20. A stationary upper support surface can be included for simultaneously heating of articles therein in individual batches or grouping. A movable upper support surface can be provided by a conveying means 29.

Conveying means 29 is designed to be particularly usable for carrying printed circuit boards 14 thereon with a plurality of electrical components 16 positioned at specific locations thereon for attachment by soldering. Conveying means 29 is preferably a continuous conveyor extending around conveying rollers 62 which are positioned normally outside of the heating chamber 12 in such a manner as to continuously pass through the chamber 12 to provide a plurality of printed circuit boards 14 with electrical components 16 positioned specifically thereon.

The oven housing 10 preferably defines a first side wall means 22 extending from the chamber inlet 18 to the chamber outlet 20 along one side of the conveying means 29. A second wall means 24 is also defined by the oven housing 10 extending along the opposite side of the conveying means 29 from the chamber inlet 18 to the chamber outlet 20.

Figure 2:
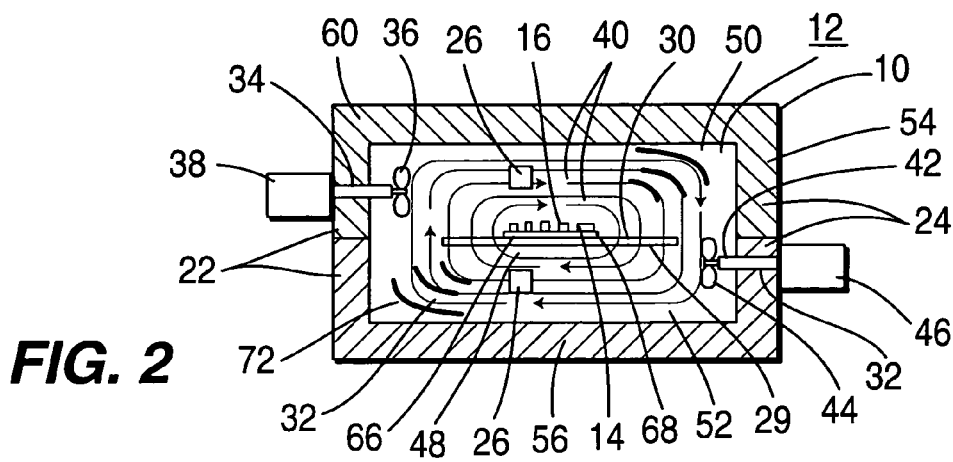
FIG. 2 is a side cross-sectional view of the embodiment shown in FIG. 1 along line 2—2 showing a heating means positioned perpendicularly to the air current from the air movement fans with articles to be heated positioned thereadjacent upon a support surface.
Figure 3:
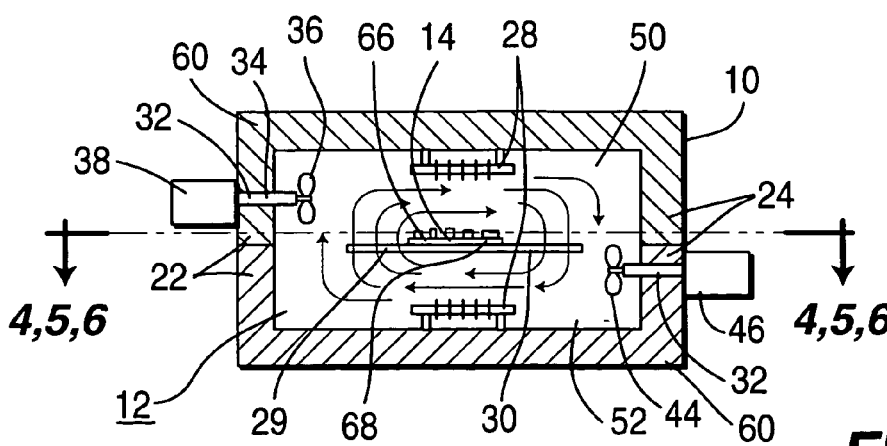
FIG. 3 is a view similar to that shown in FIG. 2 however with the inclusion of a heating means positioned parallel to the air current from the air movement fans with articles to be heated positioned thereadjacent upon a support surface.
Figure 6:
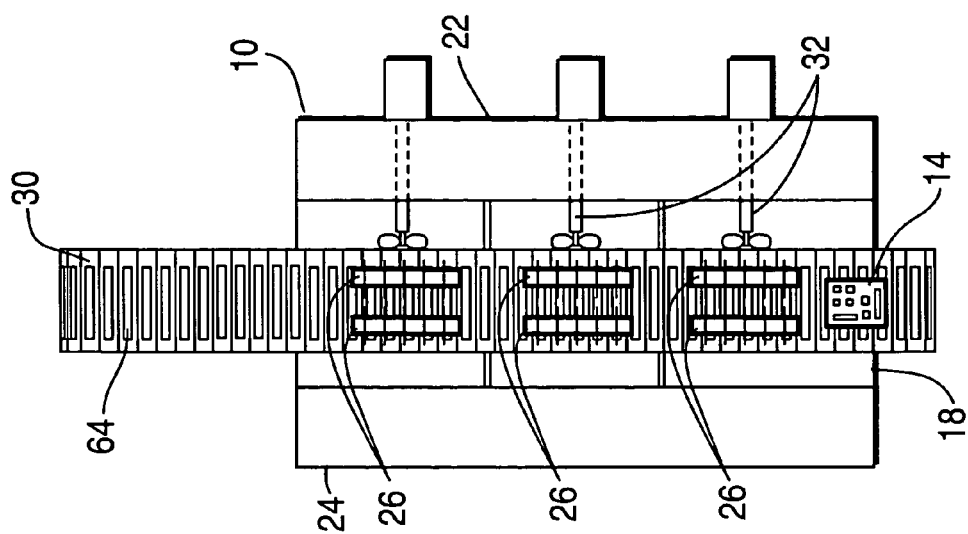
FIG. 6 is a top plan view of an embodiment of a solder reflow oven apparatus of the present invention showing three separate heating chambers with the heating device oriented parallel with respect to the direction of movement of the conveyor.
Figure 5:
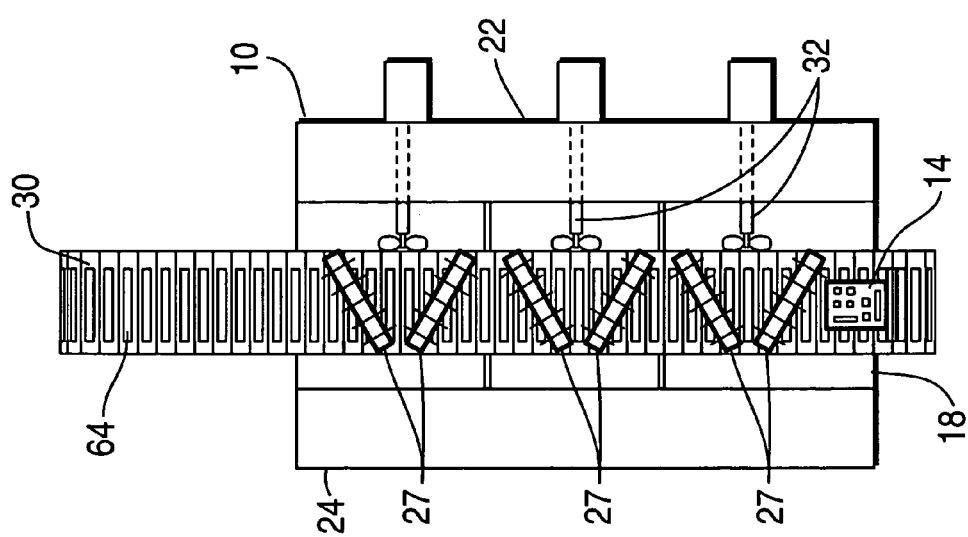
FIG. 5 is a top plan view of an embodiment of a solder reflow oven apparatus of the present invention showing three separate heating chambers with the heating device oriented angularly with respect to the direction of movement of the conveyor.
Figure 4:
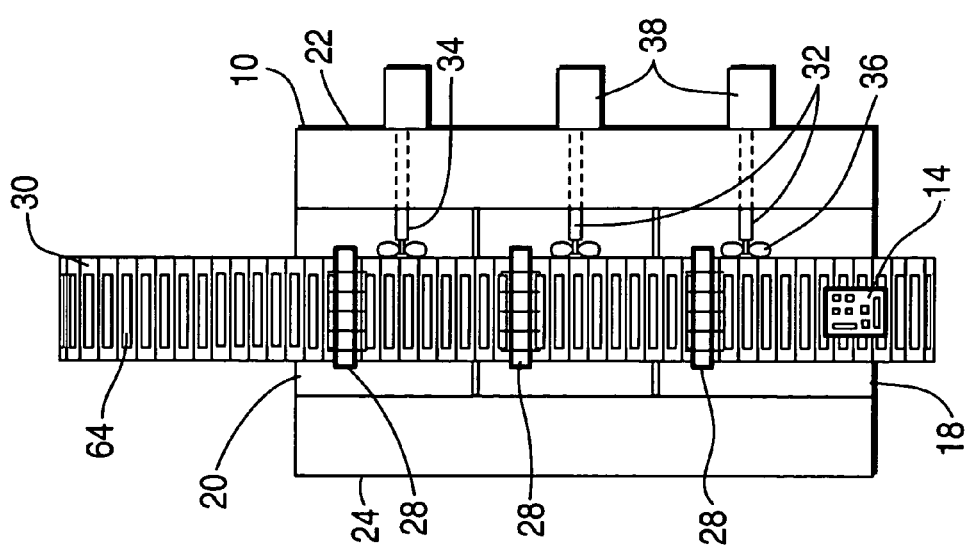
FIG. 4 top plan view of an embodiment of a solder reflow oven apparatus of the present invention showing three separate heating chambers with the heating device oriented perpendicularly with respect to the direction of movement of the conveyor.

A heating means is positioned within the heating chamber 12 of the oven housing 10. The heating means can extend parallel to the direction of movement of the conveyor as shown by heating means 26 in FIGS. 2 and 6. Alternatively the heating means can be angularly oriented with respect to the conveyor such as shown by heating means 27 shown in FIG. 5. In a third alternative, the heating device 28 can be oriented perpendicularly with respect to the conveyor as shown by heating means 28 in FIGS. 3 and 4. Preferably, the heating means will includes heating element positioned both above and below the conveyor path.

The conveying means 29 will preferably define an upper support surface 30 thereon which is adapted to receive printed circuit boards 14 with the components 16 positioned thereon for transporting thereof through the heating chamber 12.

One of the most important aspects of the present invention is the air circulation means 32. Air circulation means 32 preferably will include a first air movement means 34 located above the conveying means 29 and a second air movement means therebelow. The first air movement means 34 preferably includes a first fan means 36 powered by a first drive means 38 for urging of first heated air along the vector 40 thereof horizontally across the conveyor upper surface and throughout the upper area 50 of the heating chamber means 12. In this manner the first fan 36 will be operable to move heated air horizontally in a direction parallel to and along the upper surface of the printed circuit boards 14 traveling upon the conveyor 29. In this manner the air will travel horizontally with air flow characteristics to heat the printed circuit board 14 from above to facilitate reflow soldering thereof.

In a similar manner a second air movement means 42 is configured preferably including a second fan means 44 powered by a second drive means 46. The second fan 44 is preferably oriented horizontally at a position within the heating chamber 12 in the lower area 52 thereof lateral from and below the conveyor 29 and below the printed circuit boards 14 being carried therethrough with components 16 for soldering thereto. In this manner the second fan 44 when powered by the second drive 46 will urge the flow of second heated air along the vector 48 as shown best in FIG. 7 oppositely and displaced downwardly from the vector 40 of the first heated air. In this manner air flow 40 will heat the printed circuit board 14 and the components 16 from above whereas the second heated air moving along vector 48 will heat the printed circuit board 14 and the components 16 from below in an opposite direction. Heating from below is enhanced by the defining of a plurality of openings 64 defined in the upper support surface 30. The conveyor 29 can be made of an open configuration such as a open link chain conveyor to facilitate conforming adherence thereof about the conveying rollers 62 while at the same time allowing heated air moving along the second heated air vector 48 to move into contact with the undersurface of the printed circuit board 14 for convection heating thereof. The orientation of the first heated air vector 40 and the second heated air vector 48 in opposite parallel positions displaced vertically from one another with vector 40 being above and vector 48 being below the conveyed printed circuit board 14 and the components 16 thereon is an important design consideration for the present invention because this design tends to equalize heating throughout the individual boards 14 being conveyed.

When considering the heating properties of the first heated air 40 moved by first fan means 36, it should be appreciated that the portion of the printed circuit board 14 and the components 16 thereon closest to the first side wall 22, defined as the first side 66 of the printed circuit board will be raised to a greater temperature than the second board side 68. This temperature difference occurs because once the first heated air contacts the first side 66 of the printed circuit board, the air will become somewhat cooled. As this cooled first air travels in laminar fashion along the upper surface of the printed circuit board, it will be cooled more and more as it loses heat because it is heating the printed circuit board and the components. As such, a temperature gradient will be created extending from the first side 66 of the printed circuit board 14 to the second side 68 thereof with the first side 66 being at a higher temperature than the second side 68. This is a natural occurrence which can result in a temperature differential between the extreme first side 66 and the second side 68 of as much as three to ten degrees Celsius.

To counterbalance and equalize the heating across the entire printed circuit board 14, the orientation of the second air movement means 42 is specified to be below and in the oppositely extending direction along a second heated air vector 48. Heating achieved solely by the second heated air vector 48 will initially cause the temperature of the second side 68 of the printed circuit board 14 to increase. As the second heated air 48 travels along the undersurface of the printed circuit board 14, from the first board side 66 toward the second board side 68, the air will be cooled appreciably because of the heat that is transferred to the lower surface of the printed circuit board 14. As a result, when the second heated air 48 finally reaches the second side 68 it will be significantly cooled from the initial temperature when first contacting the first side 66 of the printed circuit board. Thus the second air movement means 42 will have the opposite effect of the first air movement means 34 by the introduction of a temperature gradient in the directly oppositely extending direction. That is, the second air movement means 42 will cause the second side 68 of the printed circuit board 14 to be raised to a temperature higher than the first side 66 thereof with a gradual temperature difference gradient extending from the elevated temperature of side 68 to a lower temperature at side 66 thereof. This heating pattern is directly opposite to the heating effect caused by the first air movement means 34. Thus, these two oppositely oriented temperature gradients will tend to cancel one another and promote overall equalization in the heating of the circuit board not achievable by any other solder reflow oven technology. Thus the introduction of this horizontal and opposed parallel air flow technology both above and below a printed circuit board achieves an equalization of heating such that temperature differences across the printed circuit board during solder reflow processing thereof can be maintained within very narrow temperature tolerances.

It is important to appreciate that this equalization of heating has many beneficial effects since it minimizes the tolerance range required for the profile of heating to achieve proper flux activation and proper soldering at all points across the printed circuit board. Also, it eliminates air volume flow differentials across the printed circuit board by providing a nearly laminar flow air stream which impinges upon the printed circuit board only in a parallel extending direction rather than including flow components thereof being oriented perpendicularly to the surface of the printed circuit board either thereabove or therebelow. Also the velocity differentials, pressure differentials and directional differentials are all minimized due to tendency for heat equalization and the orientation of heated air flow being parallel to the upper and lower surfaces of the printed circuit boards.

The standard convection solder flow ovens currently being utilized do not have the capability to produce sufficiently consistent air temperatures, pressures, volumes, velocities and directions across the entire printed circuit board and such is achievable with the novel design of the present invention. Air recirculation is an important consideration of the present invention because once the air traveling along the first heated air vector 40 reaches the opposite side of the oven it can be guided downwardly by the inclusion of an air guide means such as guide plates 70. Plates 70 are shown best in FIG. 2 and are arcuate and concave in a direction facing the conveyor such that once air has traveled horizontally along the first heated air vector 40 to the opposite side of the heating chamber 14 it can then move downwardly to provide a supply of heated air directly to the second fan means 44 positioned immediately therebelow. This guide means 70 is referred to as the first guide means.

Figure 7:
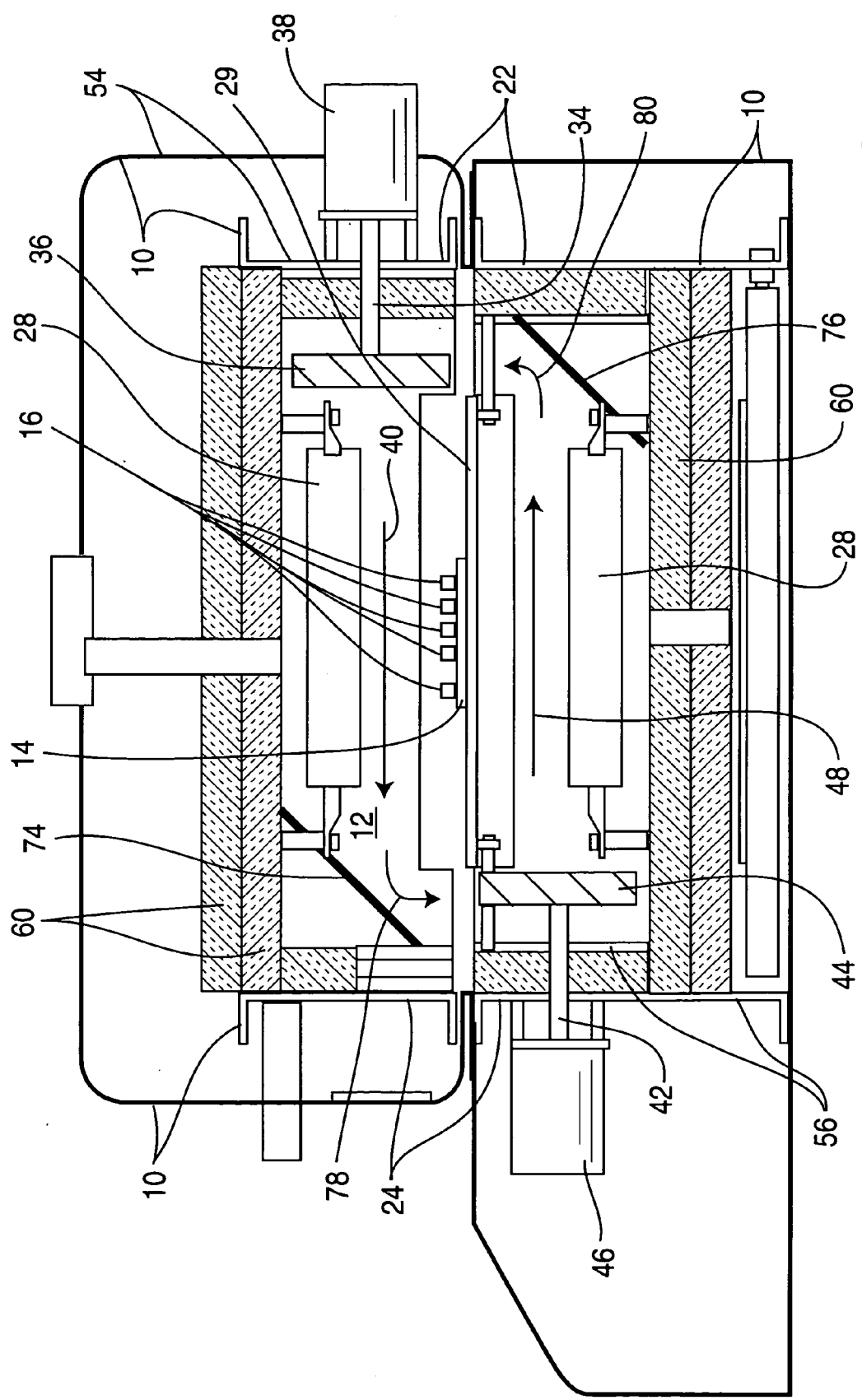
FIG. 7 is a cross-sectional illustration of an alternative embodiment of the present invention showing the inclusion of inclined walls oppositely positioned laterally within the heating chamber for facilitating recirculation of heated air back and forth between the first and second air circulation means.

In an alternative configuration as shown best in FIG. 7, the housing 10 can include a first inclined wall means 74 defined therein above conveyor 29 on the opposite side thereof from first air movement means 34. This inclined wall 74 will be angled downwardly approximately forty-five degrees relative to the upper support surface 30 in order to deflect heated air from said first fan means 36, after passing over the printed circuit boards 14 and over the conveyor 29, for urging movement thereof downwardly as shown by air flow arrow 78. In this manner air will be directed toward the second air movement means 42 in a similar manner as would be achieved by the inclusion of the first guide plate means 70, as described above. Either embodiment will facilitate the redirection of heated air flow toward the second air movement means 42.

Further in this alternative configuration, the housing 10 can include a second inclined wall means 76 defined therein below conveyor 29 on the opposite side thereof from second air movement means 42. This inclined wall 76 will be angled upwardly approximately forty-five degrees relative to the upper support surface 30 in order to deflect heated air from said second fan means 4, after passing below the printed circuit boards 14 and beneath the conveyor 29, for urging movement thereof upwardly as shown by air flow arrow 80. In this manner air will be directed toward the first air movement means 34 in a similar manner as would be achieved by the inclusion of the second guide plate means 72, as described above. Either embodiment will facilitate the redirection of heated air flow toward the first air movement means 34.

A second guide means 72 can be positioned immediately below the first air fan means 36 at the opposite position below the conveyor 29 adjacent the first side wall means 22. These second guide plates 72 can be arcuate and concave facing the conveyor in such a manner as to guide heated air upwardly toward the first air movement means 34. Thus the air will travel as shown best in FIG. 2 in a circular or cyclonic path which enhances laminar flow of air as it passes both above and below the printed circuit boards 14 with the components 16 positioned thereon to enhance evenness and equalization in heating thereof as they are conveyed through the oven housing 10. It should be fully appreciated that the recirculation or cyclonic flow patterns of the present invention are fully achievable without inclusion of the supplemental first and second guide plates 70 and 72, however inclusion of the plates are deemed helpful in some oven embodiments to facilitate this recirculation.

In the preferred configuration of the oven housing 10 an upper housing means 54 and a lower housing means 56 will be detachable with respect to one another to provide access to the interior of the oven housing 10 as desired for various purposes. Also immediately adjacent the oven housing 10 a cooling means 58 may be included. Preferably this cooling means will be positioned immediately outside of the oven adjacent the chamber outlet 20 to facilitate cooling of printed circuit boards 14 soon after they exit from the heating chamber 12. Also the oven housing 10 of the present invention can include insulation means 60 positioned at various locations therewithin as shown best in FIGS. 2 and 3 to maximize the retention of heat within the heating chamber 12 and minimize loss thereof through the oven housing 10.

While particular embodiments of this invention have been shown in the drawings and described above, it will be apparent, that many changes may be made in the form, arrangement and positioning of the various elements of the combination. In consideration thereof it should be understood that preferred embodiments of this invention disclosed herein are intended to be illustrative only and not intended to limit the scope of the invention.

We claim:

1. A solder reflow oven apparatus for soldering of components onto printed circuit boards comprising:
   A. an oven housing means defining at least one heating chamber means therewithin to facilitate reflow soldering of components to printed circuit boards located therein, said oven housing means defining a chamber inlet means in fluid flow communication with respect to said heating chamber means, said oven housing means also defining a chamber outlet means spatially disposed from said chamber inlet means and in fluid flow communication with respect to said heating chamber means, said oven housing means including a first side wall means extending from said chamber inlet means to said chamber outlet means, said oven housing means further including a second side wall means extending from said chamber inlet means to said chamber outlet means at a position laterally spatially disposed from said first side wall means to define said heating chamber means therebetween;
   B. a heating means positioned within said heating chamber means for generating heat therewithin;
   C. a conveying means extending inwardly into said heating chamber means through said chamber inlet means between said first side wall means and said second side wall means and extending outwardly from said heating chamber means through said chamber outlet means, said conveying means defining an upper support surface adapted to carry printed circuit boards thereon for movement therewith through said heating chamber means in order to facilitate reflow soldering of components to the printed circuit board;
   D. an air circulation means secured within said heating chamber means and adapted to urge movement of air within said heating chamber means adjacent said heating means for heating thereof and to urge movement of air adjacent the printed circuit boards traveling therethrough on said conveying means for reflow soldering of components thereto, said air circulation means including:
      (1) a first air movement means mounted within said oven housing means at a position higher than said conveying means and the printed circuit boards traveling thereon, said first air movement means being operable to urge movement of heated air in a direction from said first side wall means toward said second side wall means laterally across and above said conveying means in a lateral direction oriented approximately perpendicularly with respect to the direction of movement of said conveyor means and the printed circuit boards traveling thereon within said heating chamber means for heating thereof from above; and
      (2) a second air movement means secured to said oven housing means at a position lower than said conveying means and the printed circuit boards traveling thereon, said second air movement means being operable to urge movement of heated air in a direction from said second side wall means toward said first side wall means oppositely oriented with respect to said first air movement means and laterally beneath said conveying means in a lateral direction oriented approximately perpendicularly with respect to the direction of movement of said conveyor means and the printed circuit boards traveling thereon for heating thereof from below.

2. A solder reflow oven apparatus for soldering of components onto printed circuit boards as defined in claim 1 wherein said first air movement means is adapted to urge movement of heated air along a first vector positioned above and parallel to said upper support surface of said conveying means and said second air movement means is adapted to urge movement of heated air along a second vector below and parallel to said upper support surface of said conveying means, said first vector and said second vector extending approximately parallel and oriented oppositely with respect to one another.

3. A solder reflow oven apparatus for soldering of components onto printed circuit boards as defined in claim 2 wherein said first vector and said second vector are approximately oppositely oriented and vertically displaced with respect to one another with said first vector being positioned above said upper support surface of said conveying means and said second vector being positioned below said upper support surface to enhance equalization of heating of printed circuit boards traveling upon said conveying means to facilitate equalized heating thereof during reflow soldering of components thereto.

4. A solder reflow oven apparatus for soldering of components onto printed circuit boards as defined in claim 1 wherein said first air movement means comprises a first fan means and wherein said second air movement means comprises a second fan means.

5. A solder reflow oven apparatus for soldering of components onto printed circuit boards as defined in claim 1 wherein said first air movement means is positioned above and laterally displaced from said conveying means and wherein said second air movement means is positioned below and laterally displaced from said conveying means, said second air movement means being positioned on the opposite side of said conveying means from said first air movement means, said first air movement means being adapted to urge movement of heated air laterally across said upper support surface of said conveying means and across the printed circuit boards located thereon and downwardly therefrom adjacent to said second air movement means to supply air thereto to facilitate said second air movement means in urging the movement of heated air in the opposite direction below said upper support surface of said conveying means for heating the printed circuit board equally thereover to facilitate reflow soldering of components thereto.

6. A solder reflow oven apparatus for soldering of components onto printed circuit boards as defined in claim 1 wherein said air circulation means includes a first guide means positioned within said heating chamber means above said second air movement means for receiving heated air from said first air movement means after passing over said upper support surface of said conveying means and over the printed circuit boards being carried thereon for guiding the heated air downwardly therefrom toward said second air movement means, said air circulation means further including a second guide means positioned within said heating chamber means below said first air movement means for receiving heated air from said second air movement means after passing below said upper support surface of said conveying means and below the printed circuit boards being carried thereon for guiding the heated air upwardly therefrom toward said first air movement means.

7. A solder reflow oven apparatus for soldering of components onto printed circuit boards as defined in claim 6 wherein said first guide means comprises a plurality of first arcuate guide plates and wherein said second guide means comprises a plurality of second arcuate guide plates.

8. A solder reflow oven apparatus for soldering of components onto printed circuit boards as defined in claim 1 wherein said first air movement means is secured directly to said first side wall means and said second air movement means is secured directly to said second side wall means.

9. A solder reflow oven apparatus for soldering of components onto printed circuit boards as defined in claim 1 further comprising a first drive means operatively secured to said first air movement means for powering thereof and further comprising a second drive means operatively secured to said second air movement means for powering thereof.

10. A solder reflow oven apparatus for soldering of components onto printed circuit boards as defined in claim 1 wherein said conveying means comprises is continuously movable from said input means to said output means through said heating chamber means and wherein said conveying means is of an open configuration to facilitate airflow therethrough for further equalizing heating of printed circuit boards thereon for reflow soldering of components thereonto.

11. A solder reflow oven apparatus for soldering of components onto printed circuit boards as defined in claim 1 wherein said heating means extends longitudinally parallel with respect to the direction of movement of said conveying means within said heating chamber means above and below said conveying means to facilitate heating of air moved laterally thereabove responsive to operation of said first air movement means and to facilitate heating of air moved laterally therebelow responsive to operation of said second air movement means.

12. A method for soldering components onto a printed circuit board within an reflow oven comprising:
  A. conveying of printed circuit boards with components positioned thereon to be soldered thereto through a solder reflow oven;
  B. heating of air within the reflow oven;
  C. first circulating of heated air in the upper areas of the reflow oven above and laterally across the upper surface of the printed circuit boards in a direction extending approximately parallel thereto and approximately horizontally thereover and oriented approximately perpendicularly with respect to the direction of conveying movement thereof while conveying thereof through the solder reflow oven to facilitate soldering of components thereto; and
  D. second circulating of heated air in the lower areas of the reflow oven below and laterally across beneath the lower surface of the printed circuit boards in a direction extending approximately parallel thereto and approximately horizontally thereunder and also being oriented approximately perpendicularly with respect to the direction of conveying movement thereof in a direction oppositely oriented to the direction of said first circulating of air and displaced therebelow to facilitate equalization of heating of the printed circuit boards during reflow soldering of components thereto while conveying thereof through the solder reflow oven.

13. A method for soldering components onto a printed circuit board within an reflow oven as defined in claim 12 wherein said heating of air within the reflow oven is performed by a first heating means located within the reflow oven at a location above the printed circuit boards being conveyed therethrough for heating of the first circulated air and wherein said heating of air within the reflow oven is also performed by a second heating element located within the reflow oven at a location below the printed circuit boards being conveyed therethrough for heating of the second circulated air.

14. A method for soldering components onto a printed circuit board within an reflow oven as defined in claim 12 further comprising guiding downwardly of said first circulating heated air after passing above and over the printed circuit boards being conveyed for facilitating supplying of heated air for said second circulating thereof below the conveyed printed circuit boards.

15. A method for soldering components onto a printed circuit board within an reflow oven as defined in claim 12 further comprising guiding upwardly of said second circulated heated air after passing below and under the conveyed printed circuit boards for facilitating supplying of heated air for said first circulating thereof above the conveyed printed circuit boards.

16. A method for soldering components onto a printed circuit board within an reflow oven as defined in claim 12 wherein said first circulating of heated air is performed by a first air circulating device positioned above and laterally adjacent to the path of movement of the conveyed printed circuit boards.

17. A method for soldering components onto a printed circuit board within an reflow oven as defined in claim 16 wherein said second circulating of heated air is performed by a second air circulating device positioned below and laterally adjacent to the path of movement of the conveyed printed circuit boards, the second air circulating device being located spatially disposed on the opposite side of the path of movement of the conveyed printed circuit board from the first air circulating device.

18. A method for soldering components onto a printed circuit board within an reflow oven as defined in claim 12 wherein said first circulating of heated air is operative to supply greater heat to the portion of the conveyed printed circuit boards closer thereto and wherein said second circulating of heated air is operative to supply greater heat to the portion of the conveyed printed circuit boards closer thereto in order to facilitate equalizing of heating applied across the printed circuit boards responsive to the opposed direction of movement of the heated air circulated thereover and thereunder by said first circulating and said second circulating, respectively.

19. A method for soldering components onto a printed circuit board within an reflow oven as defined in claim 12 wherein said conveying of printed circuit boards is performed with an open conveying device defining openings vertically therethrough in order to facilitate heating of the undersurface of the conveyed printed circuit boards by said second circulating of heated air in the lower areas of the reflow oven below and laterally across beneath the printed circuit boards being conveyed therethrough.

* * * * *